United States Patent
Kim

(10) Patent No.: US 12,035,080 B2
(45) Date of Patent: *Jul. 9, 2024

(54) IMAGE SENSING DEVICE USING INTERPOLATED IMAGES TO GENERATE REFINED IMAGES

(71) Applicant: SK hynix Inc., Gyeonggi-do (KR)

(72) Inventor: Jin Su Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,393

(22) Filed: Apr. 14, 2023

(65) Prior Publication Data

US 2023/0254464 A1 Aug. 10, 2023

Related U.S. Application Data

(62) Division of application No. 17/333,711, filed on May 28, 2021, now Pat. No. 11,671,571.

(30) Foreign Application Priority Data

Dec. 10, 2020 (KR) ........................ 10-2020-0172539

(51) Int. Cl.
*H04N 9/64* (2023.01)
*H04N 9/03* (2023.01)
*H04N 25/11* (2023.01)

(52) U.S. Cl.
CPC ................. *H04N 9/64* (2013.01); *H04N 9/03* (2023.01); *H04N 25/11* (2023.01)

(58) Field of Classification Search
CPC . H04N 9/64; H04N 9/03; H04N 25/11; H04N 23/843; H04N 5/262; H04N 5/30; G06T 3/4015; G06T 5/006; G06T 2207/20081; G06T 2207/20084; G06T 3/4007; G06N 3/04; G06N 3/08; G06N 3/082

See application file for complete search history.

(56) References Cited

U.S. PATENT DOCUMENTS

2016/0037044 A1* 2/2016 Motta .................. H04N 25/585
348/221.1
2020/0302265 A1* 9/2020 Wang ....................... G06N 3/04

* cited by examiner

*Primary Examiner* — Mekonnen D Dagnew
(74) *Attorney, Agent, or Firm* — IP & T GROUP LLP

(57) ABSTRACT

Disclosed is an image sensing device including a first module suitable for generating a plurality of interpolated images separated for each color channel, based on a raw image and a plurality of first convolution layers, a second module suitable for generating a plurality of refined images separated for each color channel, based on the plurality of interpolated images and a plurality of second convolution layers, and a third module suitable for generating at least one output image corresponding to the raw image, based on the plurality of refined images and a plurality of third convolution layers.

9 Claims, 9 Drawing Sheets

IMAGE SENSING DEVICE USING INTERPOLATED IMAGES TO GENERATE REFINED IMAGES

CROSS-REFERENCE TO RELATED APPLICATION(S)

This application is a division of U.S. patent application Ser. No. 17/333,711 filed on May 28, 2021, which claims priority under 35 U.S.C. § 119 to Korean Patent Application No. 10-2020-0172539, filed on Dec. 10, 2020, the disclosure of which is incorporated herein by reference in its entirety.

BACKGROUND

1. Field

Various embodiments of the present disclosure relate to a semiconductor design technique, and more particularly, to an image sensing device.

2. Description of the Related Art

Image sensing devices are devices for capturing images using the property of a semiconductor which reacts to light. Image sensing devices are generally classified into charge-coupled device (CCD) image sensing devices and complementary metal-oxide semiconductor (CMOS) image sensing devices. Recently, CMOS image sensing devices are widely used because the CMOS image sensing devices can allow both analog and digital control circuits to be directly implemented on a single integrated circuit (IC).

SUMMARY

Various embodiments of the present disclosure are directed to an image sensing device capable of end-to-end learning when generating an output image from a raw image.

In accordance with an embodiment, an image sensing device may include: a first module suitable for generating a plurality of interpolated images separated for each color channel, based on a raw image and a plurality of first convolution layers; a second module suitable for generating a plurality of refined images separated for each color channel, based on the plurality of interpolated images and a plurality of second convolution layers; and a third module suitable for generating at least one output image corresponding to the raw image, based on the plurality of refined images and a plurality of third convolution layers.

The second module may learn weights included in each of the plurality of second convolution layers to generate the plurality of refined images.

The third module may learn weights included in each of the plurality of third convolution layers to generate the output image.

Each of the plurality of first convolution layers may include weights each having a fixed value or weights in which a fixed value and a variable value are mixed.

In accordance with an embodiment of the present disclosure, an image sensing device may include: a first module suitable for generating a plurality of interpolated images separated for each color channel while maintaining an alignment in a set color filter pattern, based on a raw image generated through the set color filter pattern; a second module suitable for generating a plurality of refined images based on the plurality of interpolated images and a first learning algorithm; and a third module suitable for generating at least one output image corresponding to the raw image, based on the plurality of refined images and a second learning algorithm.

The first module may use a plurality of first convolution layers to generate the plurality of interpolated images.

Each of the plurality of first convolution layers may include weights each having a fixed value or weights in which a fixed value and a variable value are mixed.

The second module may use a plurality of second convolution layers to generate the plurality of refined images, and learn weights included in each of the plurality of second convolution layers.

The third module may use a plurality of third convolution layers to generate the output image, and learn weights included in each of the plurality of third convolution layers.

In accordance with an embodiment of the present disclosure, an image sensing device may include: a first module suitable for receiving a raw image and generating a plurality of interpolated images based on the raw image and first to third convolution layers, the plurality of interpolated images including a first subset of interpolated images associated with a first color channel and the first convolution layer, a second subset of interpolated images associated with a second color channel and the second convolution layer, a third subset of interpolated images associated with a third color channel and the third convolution layer; a second module suitable for generating a plurality of refined images based on the plurality of interpolated images and fourth to sixth convolution layers, the plurality of refined images including a first subset of refined images associated with the first color channel and the fourth convolution layer, a second subset of refined images associated with the second color channel and the fifth convolution layer, a third subset of refined images associated with the third color channel and the sixth convolution layer; and a third module suitable for correcting the plurality of refined images to generate an output image.

In accordance with an embodiment of the present disclosure, an image sensing device may include: an image sensor including a pixel array having a predetermined color filter pattern, and suitable for generating a raw image; and an image processor suitable for generating an output image based on the raw image, and supporting an end-to-end learning network using a plurality of convolution layers when generating the output image based on the raw image.

The learning network may be designed to maintain an alignment in the predetermined color filter pattern when interpolating the raw image.

DETAILED DESCRIPTION

Various embodiments of the present disclosure are described below with reference to the accompanying drawings, in order to describe in detail the present disclosure so that those with ordinary skill in art to which the present disclosure pertains, may easily carry out the technical spirit of the present disclosure.

It will be understood that throughout the specification, when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
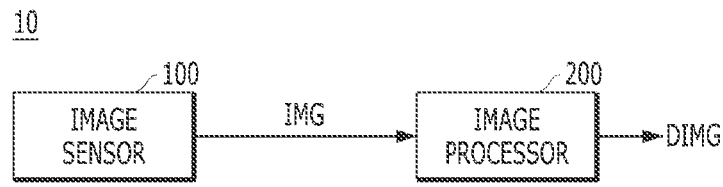
FIG. 1 is a block diagram illustrating an image sensing device in accordance with an embodiment of the present disclosure.

FIG. 1 is a block diagram illustrating an image sensing device in accordance with an embodiment of the present disclosure.

Referring to FIG. 1, the image sensing device 10 may include an image sensor 100 and an image processor 200.

The image sensor 100 may generate a raw image IMG according to incident light.

The image processor 200 may generate an output image DIMG based on the raw image IMG. The image processor 200 may support an end-to-end learning network using a plurality of convolution layers when generating the output image DIMG based on the raw image IMG. The image processor 200 may generate the output image DIMG with improved clarity by improving an artifact included in the raw image IMG and/or an artifact generated when processing the raw image IMG through the end-to-end learning network.

Figure 2:
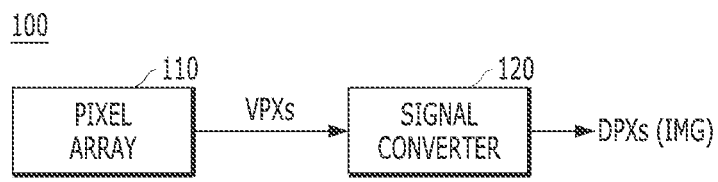
FIG. 2 is a block diagram illustrating an image sensor illustrated in FIG. 1.

FIG. 2 is a block diagram illustrating the image sensor 100 illustrated in FIG. 1.

Referring to FIG. 2, the image sensor 100 may include a pixel array 110 and a signal converter 120.

Figure 3:
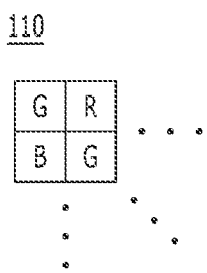
FIG. 3 is a diagram illustrating an example of a pixel array illustrated in FIG. 2.

The pixel array 110 may include a plurality of pixels arranged in a row direction and a column direction (refer to FIG. 3). The pixel array 110 may generate analog-type image values VPXs for each row. For example, the pixel array 110 may generate the image values VPXs from pixels arranged in a first row during a first row time, and generate the image values VPXs from pixels arranged in an $n^{th}$ row during an $n^{th}$ row time, where "n" is an integer greater than 2.

The signal converter 120 may convert the analog-type image values VPXs into digital-type image values DPXs. The raw image IMG may include the image values DPXs. For example, the signal converter 120 may include an analog-to-digital converter.

FIG. 3 is a diagram illustrating an example of the pixel array 110 illustrated in FIG. 2.

Referring to FIG. 3, the pixel array 110 may be arranged in a set color filter pattern. For example, the set color filter pattern may be a Bayer pattern. The Bayer pattern may be composed of repeating cells each having 2×2 pixels. In each of the cells, two pixels G and G each having a green color filter (hereinafter referred to as a "green color") may be disposed to diagonally face each other at corners thereof, and a pixel B having a blue color filter (hereinafter referred to as a "blue color") and a pixel R having a red color filter (hereinafter referred to as a "red color") may be disposed at the other corners thereof. The four pixels G, R, B and G are not necessarily limited to the arrangement structure illustrated in FIG. 3, but may be variously disposed based on the Bayer pattern described above.

Although the present embodiment describes as an example that the pixel array 110 has the Bayer pattern, the present disclosure is not limited thereto, and may have various patterns such as a quad pattern.

Figure 4:
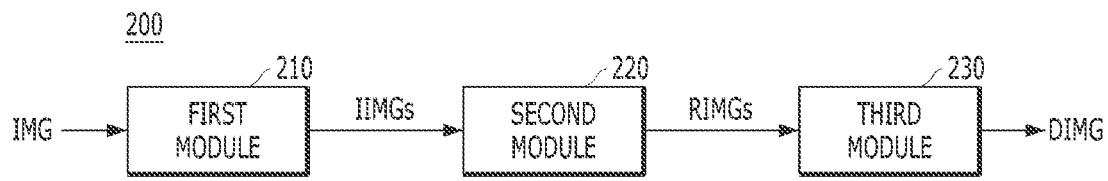
FIG. 4 is a block diagram illustrating an image processor illustrated in FIG. 1.

FIG. 4 is a block diagram illustrating the image processor 200 illustrated in FIG. 1.

Referring to FIG. 4, the image processor 200 may include a first module 210, a second module 220 and a third module 230.

The first module 210 may generate a plurality of interpolated images IIMGs separated for each color channel, based on the raw image IMG. For example, the plurality of interpolated images IIMGs may include a first interpolated image IIMG1 according to a green channel, a second interpolated image IIMG2 according to a red channel and a third interpolated image IIMG3 according to a blue channel. The first module 210 may use a plurality of first convolution layers when generating the plurality of interpolated images IIMGs. For example, the first module 210 may generate the first interpolated image IIMG1 based on the raw image IMG and a first convolution layer CL1, generate the second interpolated image IIMG2 based on the raw image IMG and a second convolution layer CL2, and generate the third interpolated image IIMG3 based on the raw image IMG and a third convolution layer CL3. The first module 210 may interpolate the raw image IMG for each color channel and generate the plurality of interpolated images IIMGs while maintaining the alignment in the Bayer pattern (refer to FIGS. 8 to 10).

The second module 220 may generate a plurality of refined images RIMGs separated for each color channel, based on the plurality of interpolated images IIMGs and a first learning algorithm. For example, the plurality of refined images RIMGs may include a first refined image RIMG1 according to the green channel, a second refined image RIMG2 according to the red channel and a third refined image RIMG3 according to the blue channel. The second module 220 may use a plurality of second convolution layers when generating the plurality of refined images RIMGs. For example, the second module 220 may generate the first refined image RIMG1 based on the first to third interpolated images IIMG1, IIMG2 and IIMG3 and a fourth convolution layer CL4. Further, the second module 220 may generate the second refined image RIMG2 based on the first to third interpolated images IIMG1, IIMG2 and IIMG3 and a fifth convolution layer CL5. Furthermore, the second module 220 may generate the third refined image RIMG3 based on the first to third interpolated images IIMG1, IIMG2 and IIMG3 and a sixth convolution layer CL6. The second module 220 may learn weights included in each of the plurality of second convolution layers, based on the first learning algorithm.

The third module 230 may generate at least one output image DIMG based on the plurality of refined images RIMGs and a second learning algorithm. The third module 230 may learn and correct defects, noise, etc. of the plurality of refined images RIMGs, and generate the output image DIMG having excellent quality. Since the third module 230 may use a well-known deep learning network as the second learning algorithm, a detailed description of the third module 230 will be omitted below. For reference, the well-known deep learning network may be extended to various fields according to the desired purpose, and use, as an input image, a general image, for example, JPEG, BMP, etc., not the image, for example, the refined image, of the present disclosure.

Figure 5:
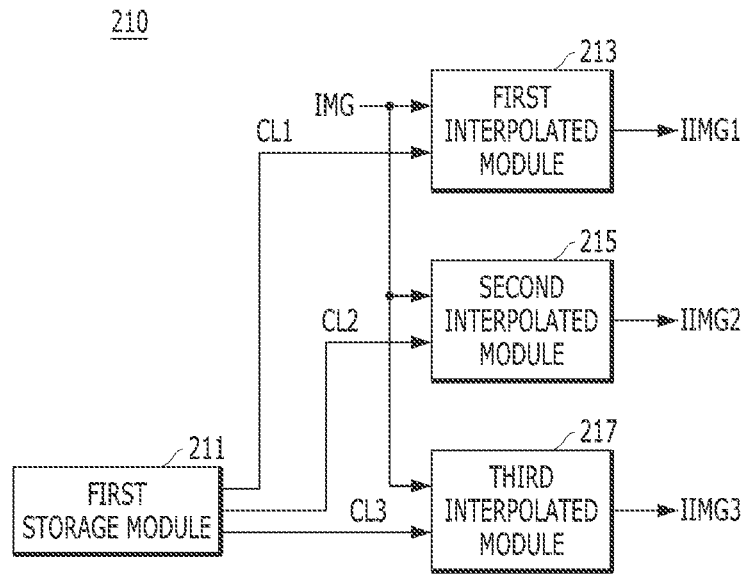
FIG. 5 is a block diagram illustrating an example of a first module illustrated in FIG. 4.

FIG. 5 is a block diagram illustrating an example of the first module 210 illustrated in FIG. 4. By way of example, the first module 210 generating the first to third interpolated images IIMG1, IIMG2 and IIMG3 will be described.

Referring to FIG. 5, the first module 210 may include a first storage module 211, a first interpolation module 213, a second interpolation module 215 and a third interpolation module 217.

The first storage module 211 may store the first convolution layer CL1, the second convolution layer CL2 and the third convolution layer CL3. For example, the first convolution layer CL1 may include first to fourth convolution kernels CK11, CK12, CK13 and CK14 corresponding to the color filter pattern of the pixel array 110 (refer to FIG. 8). Each of the first to fourth convolution kernels CK11, CK12, CK13 and CK14 may include weights for interpolating the green channel. All of the weights may each have a fixed value. The second convolution layer CL2 may include first to fourth convolution kernels CK21, CK22, CK23 and CK24 corresponding to the color filter pattern of the pixel array 110 (refer to FIG. 9). For example, each of the first to fourth convolution kernels CK21, CK22, CK23 and CK24 may include weights for interpolating the red channel. All of the weights may each have a fixed value. The third convolution layer CL3 may include first to fourth convolution kernels CK31, CK32, CK33 and CK34 corresponding to the color filter pattern of the pixel array 110 (refer to FIG. 10). For example, each of the first to fourth convolution kernels CK31, CK32, CK33, and CK34 may include weights for interpolating the blue channel. All of the weights may each have a fixed value.

The first interpolation module 213 may generate the first interpolated image IIMG1 of the green channel, based on the raw image IMG and the weights included in the first convolution layer CL1.

The second interpolation module 215 may generate the second interpolated image IIMG2 of the red channel, based on the raw image IMG and the weights included in the second convolution layer CL2.

The third interpolation module 217 may generate the third interpolated image IIMG3 of the blue channel, based on the raw image IMG and the weights included in the third convolution layer CL3.

Figure 6:
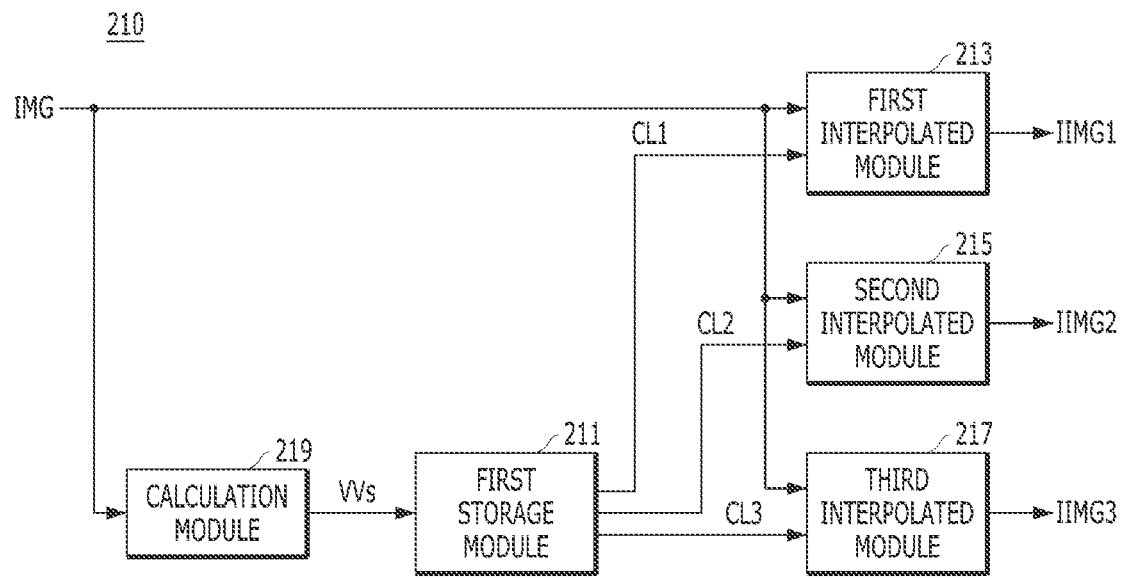
FIG. 6 is a block diagram illustrating another example of the first module illustrated in FIG. 4.

FIG. 6 is a block diagram illustrating another example of the first module 210 illustrated in FIG. 4. By way of example, the first module 210 generating the first to third interpolated images IIMG1, IIMG2 and IIMG3 will be described.

Referring to FIG. 6, the first module 210 may include a calculation module 219, a first storage module 211, a first interpolation module 213, a second interpolation module 215 and a third interpolation module 217.

The calculation module 219 may calculate variable values VVs among the weights included in each of the first to third convolution layers CL1, CL2 and CL3, based on the raw image IMG.

The first storage module 211 may store the first convolution layer CL1, the second convolution layer CL2 and the third convolution layer CL3. For example, the first convolution layer CL1 may include first to fourth convolution kernels CK11, CK12, CK13 and CK14 corresponding to the color filter pattern of the pixel array 110 (refer to FIG. 8). Each of the first to fourth convolution kernels CK11, CK12, CK13 and CK14 may include weights for interpolating the green channel. The weights may have fixed values and variable values. The variable values may be some of the variable values VVs. The second convolution layer CL2 may include first to fourth convolution kernels CK21, CK22, CK23 and CK24 corresponding to the color filter pattern of the pixel array 110 (refer to FIG. 9). For example, each of the first to fourth convolution kernels CK21, CK22, CK23 and CK24 may include weights for interpolating the red channel. The weights may have fixed values and variable values. The variable values may be others of the variable values VVs. The third convolution layer CL3 may include first to fourth convolution kernels CK31, CK32, CK33 and CK34 corresponding to the color filter pattern of the pixel array 110 (refer to FIG. 10). For example, each of the first to fourth convolution kernels CK31, CK32, CK33 and CK34 may include weights for interpolating the blue channel. The weights may have fixed values and variable values. The variable values may be the others of the variable values VVs.

The first interpolation module 213 may generate the first interpolated image IIMG1 of the green channel, based on the raw image IMG and the weights included in the first convolution layer CL1.

The second interpolation module 215 may generate the second interpolated image IIMG2 of the red channel, based on the raw image IMG and the weights included in the second convolution layer CL2.

The third interpolation module 217 may generate the third interpolated image IIMG3 of the blue channel, based on the raw image IMG and the weights included in the third convolution layer CL3.

Figure 7:
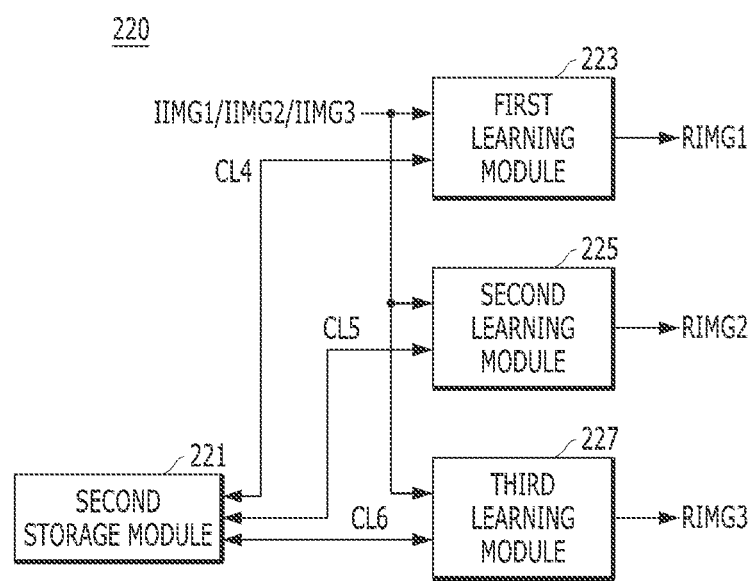
FIG. 7 is a block diagram illustrating a second module illustrated in FIG. 4.

FIG. 7 is a block diagram illustrating the second module 220 illustrated in FIG. 4. By way of example, the second module 220 generating the first to third refined images RIMG1, RIMG2 and RIMG3 will be described.

Referring to FIG. 7, the second module 220 may include a second storage module 221, a first learning module 223, a second learning module 225 and a third learning module 227.

The second storage module 221 may store the fourth convolution layer CL4, the fifth convolution layer CL5 and the sixth convolution layer CL6. For example, the fourth convolution layer CL4 may include first to third convolution kernels CK41, CK42 and CK43, which convolute with the first to third interpolated images IIMG1, IIMG2 and IIMG3, respectively, to generate the first refined image RIMG1 of the green channel (refer to FIG. 11). Each of the first to third convolution kernels CK41, CK42 and CK43 may include weights. The weights may be variable values. The fifth convolution layer CL5 may include first to third convolution kernels CK51, CK52 and CK53, which convolute with the first to third interpolated images IIMG1, IIMG2 and IIMG3, respectively, to generate the second refined image RIMG2 of the red channel (refer to FIG. 12). Each of the first to third convolution kernels CK51, CK52 and CK53 may include weights. The weights may be variable values. The sixth convolution layer CL6 may include first to third convolution kernels CK61, CK62 and CK63, which convolute with the first to third interpolated images IIMG1, IIMG2 and IIMG3, respectively, to generate the third refined image RIMG3 of the blue channel (refer to FIG. 13). Each of the first to third convolution kernels CK61, CK62 and CK63 may include weights. The weights may be variable values.

The first learning module 223 may generate the first refined image RIMG1 based on the fourth convolution layer CL4 and the first to third interpolated images IIMG1, IIMG2 and IIMG3. The first learning module 223 may change or update the weights, included in the fourth convolution layer CL4, through learning when generating the first refined image RIMG1. The first learning module 223 may repeat a convolution operation at least once when generating the first refined image RIMG1. When the first learning module 223 repeats the convolution operation "N" times, an "N" more fourth convolution layer CL4 may be needed.

The second learning module 225 may generate the second refined image RIMG2 based on the fifth convolution layer CL5 and the first to third interpolated images IIMG1, IIMG2 and IIMG3. The second learning module 225 may change or update the weights, included in the fifth convolution layer CL5, through learning when generating the second refined image RIMG2. The second learning module 225 may repeat a convolution operation at least once when generating the second refined image RIMG2. When the second learning module 225 repeats the convolution operation "N" times, an "N" more fifth convolution layer CL5 may be needed.

The third learning module 227 may generate the third refined image RIMG3 based on the sixth convolution layer CL6 and the first to third interpolated images IIMG1, IIMG2 and IIMG3. The third learning module 227 may change or update the weights, included in the sixth convolution layer CL6, through learning when generating the third refined image RIMG3. The third learning module 227 may repeat a convolution operation at least once when generating the third refined image RIMG3. When the third learning module 227 repeats the convolution operation "N" times, an "N" more sixth convolution layer CL6 may be needed.

Hereinafter, an operation of the image sensing device 10 in accordance with an embodiment of the present disclosure, which has the above-described configuration, is described.

When the image sensor 100 generates the raw image IMG according to incident light, the image processor 200 may generate the output image DIMG with improved clarity by improving an artifact included in the raw image IMG and/or an artifact generated when processing the raw image IMG through the end-to-end learning network.

Figure 8:
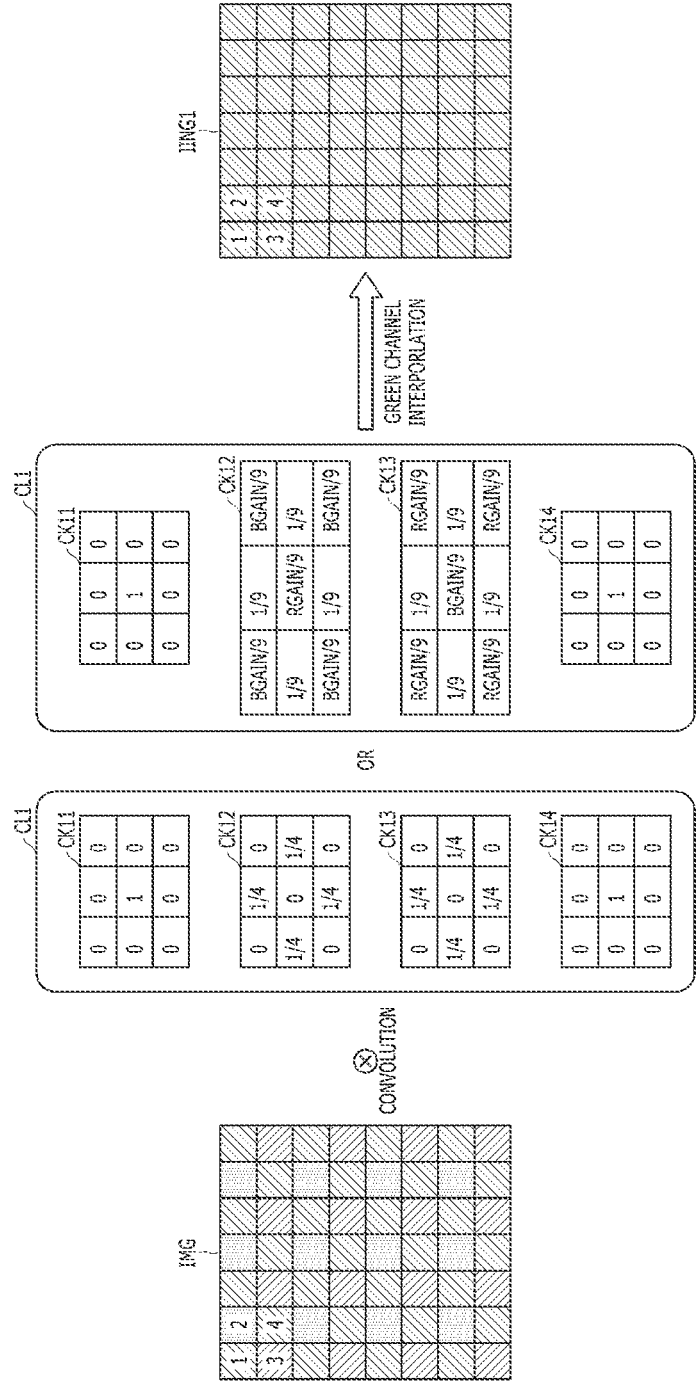
FIGS. 8 to 13 are diagrams illustrating an operation of the image sensing device illustrated in FIG. 1 in accordance with embodiments of the present disclosure.
Figure 9:
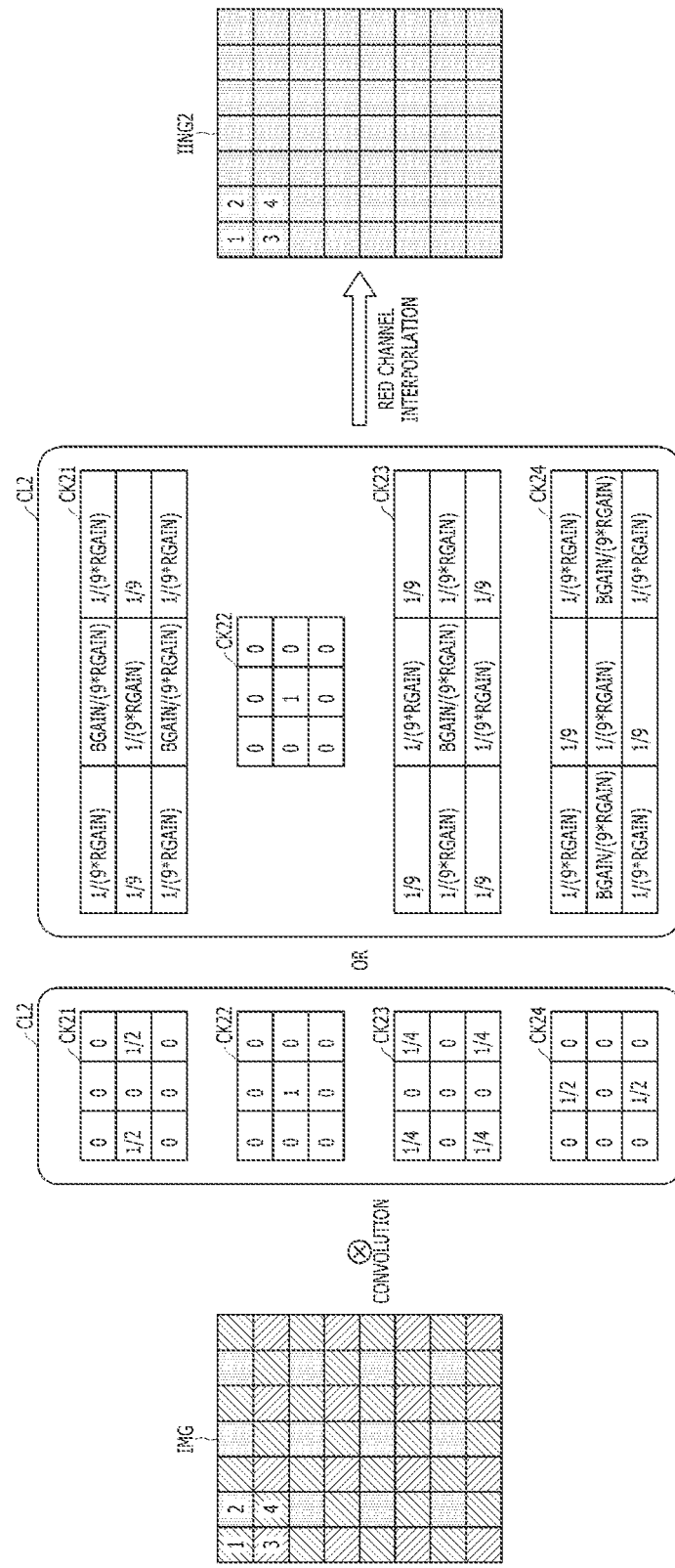
Figure 10:
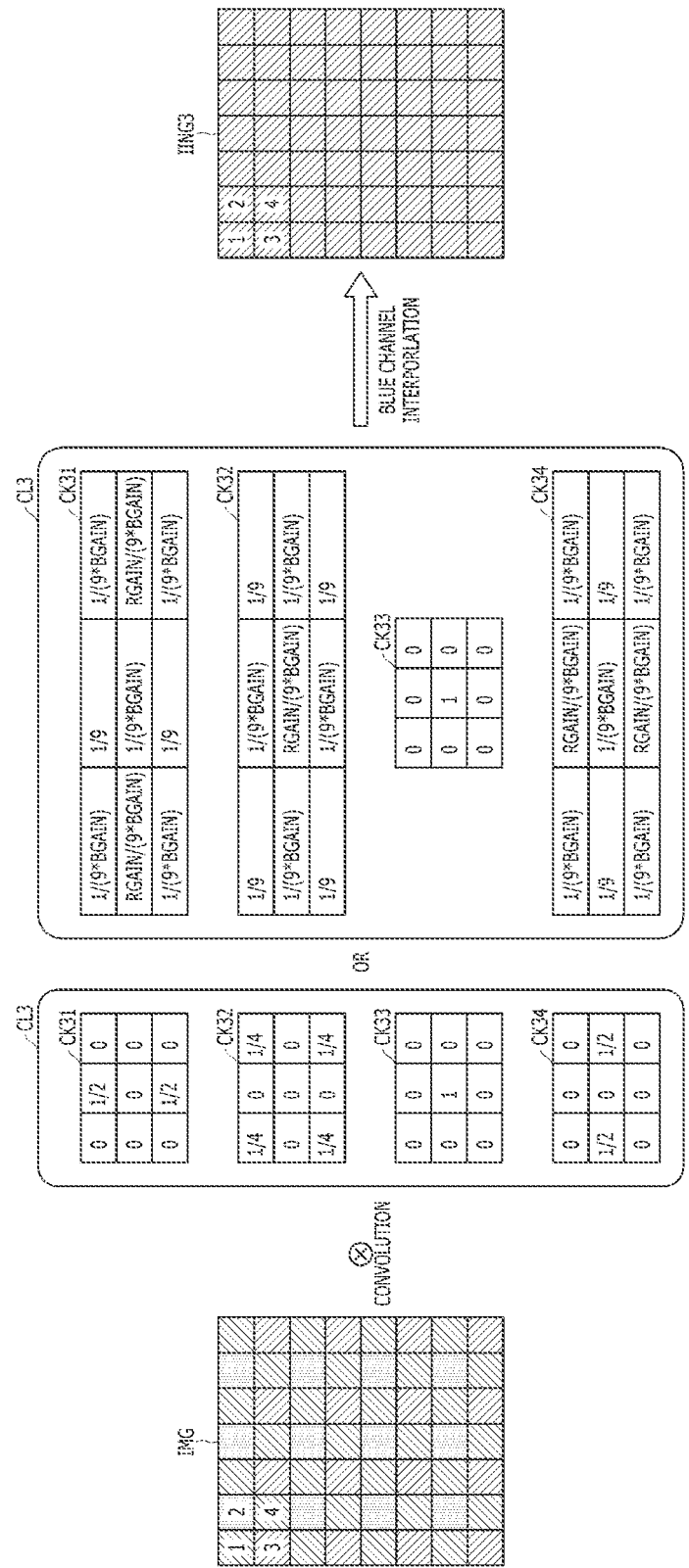

FIGS. 8 to 10 are diagrams illustrating operations of the first module 210 included in the image processor 200.

Referring to FIG. 8, the first module 210 may generate the first interpolated image IIMG1 based on the raw image IMG and the first convolution layer CL1. The first module 210 may selectively use the first to fourth convolution kernels CK11, CK12, CK13 and CK14 according to locations of image values included in the raw image IMG. For example, the first module 210 may use the first convolution kernel CK11 when interpolating an image value 1 at a location where an odd-numbered row and an odd-numbered column intersect among image values corresponding to the Bayer pattern. Further, the first module 210 may use the second convolution kernel CK12 when interpolating an image value 2 at a location where the odd-numbered row and an even-numbered column intersect among the image values corresponding to the Bayer pattern. Furthermore, the first module 210 may use the third convolution kernel CK13 when interpolating an image value 3 at a location where an even-numbered row and the odd-numbered column intersect among the image values corresponding to the Bayer pattern. Furthermore, the first module 210 may use the fourth convolution kernel CK14 when interpolating an image value 4 at a location where the even-numbered row and the even-numbered column intersect among the image values corresponding to the Bayer pattern. In other words, the first module 210 may interpolate the raw image IMG according to the green channel and generate the first interpolated image IIMG1 while maintaining the alignment in the green color of the Bayer pattern.

In an embodiment, each of the first to fourth convolution kernels CK11, CK12, CK13 and CK14 may include weights each having a fixed value. For example, in the first convolution kernel CK11, since the image value 1 at the intersection of the odd-numbered row and the odd-numbered column corresponds to the green color, the weight applied to the image value 1 may be "1", and the weight applied to peripheral image values may be "0". In the second convolution kernel CK12, since the image value 2 at the intersection of the odd-numbered row and the even-numbered column corresponds to the red color, the weight applied to the image value 2 may be "0", the weight applied to peripheral image values corresponding to the green color may be "¼", and the weight applied to peripheral image values corresponding to the blue color may be "0". In the third convolution kernel CK13, since the image value 3 at the intersection of the even-numbered row and the odd-numbered column corresponds to the blue color, the weight applied to the image value 3 may be "0", the weight applied to peripheral image values corresponding to the green color may be "¼", and the weight applied to peripheral image values corresponding to the red color may be "0". In the fourth convolution kernel CK14, since the image value 4 at the intersection of the even-numbered row and the even-numbered column corresponds to the green color, the weight applied to the image value 4 may be "1", and the weight applied to peripheral image values may be "0".

In an embodiment, each of the first to fourth convolution kernels CK11, CK12, CK13 and CK14 may include weights each having a fixed value, or weights in which a fixed value and a variable value are mixed. For example, in the first convolution kernel CK11, since the image value 1 at the intersection of the odd-numbered row and the odd-numbered column corresponds to the green color, the weight applied to the image value 1 may be "1", and the weight applied to peripheral image values may be "0". In the second convolution kernel CK12, since the image value 2 at the intersection of the odd-numbered row and the even-numbered column corresponds to the red color, the weight applied to the image value 2 may be "RGAIN/9", the weight applied to peripheral image values corresponding to the green color may be "1/9", and the weight applied to peripheral image values corresponding to the blue color may be "BGAIN/9". "RGAIN" is calculated according to Equation 1 below, and "BGAIN" is calculated according to Equation 2 below.

$$RGAIN = TGV/TRV \quad \text{[Equation 1]}$$

Herein, "TGV" represents an average value of all the image values corresponding to the green color among the image values included in the raw image IMG, and "TRV" represents an average value of all the image values corresponding to the red color among the image values included in the raw image IMG.

$$BGAIN = TGV/TBV \quad \text{[Equation 2]}$$

Herein, "TBV" represents an average value of all the image values corresponding to the blue color among the image values included in the raw image IMG.

Subsequently, in the third convolution kernel CK13, since the image value 3 at the intersection of the even-numbered row and the odd-numbered column corresponds to the blue color, the weight applied to the image value 3 may be "BGAIN/9", the weight applied to peripheral image values corresponding to the green color may be "1/9", and the weight applied to peripheral image values corresponding to the red color may be "RGAIN/9". "RGAIN" is calculated according to Equation 1 above, and "BGAIN" is calculated according to Equation 2 above. In the fourth convolution kernel CK14, since the image value 4 at the intersection of the even-numbered row and the even-numbered column corresponds to the green color, the weight applied to the image value 4 may be "1", and the weight applied to peripheral image values may be "0".

Referring to FIG. 9, the first module 210 may generate the second interpolated image IIMG2 based on the raw image IMG and the second convolution layer CL2. The first module 210 may selectively use the first to fourth convolution kernels CK21, CK22, CK23 and CK24 according to locations of image values included in the raw image IMG. For example, the first module 210 may use the first convolution kernel CK21 when interpolating an image value 1 at a location where an odd-numbered row and an odd-numbered column intersect among image values corresponding to the Bayer pattern. Further, the first module 210 may use the second convolution kernel CK22 when interpolating an image value 2 at a location where the odd-numbered row and an even-numbered column intersect among the image values corresponding to the Bayer pattern. Furthermore, the first module 210 may use the third convolution kernel CK23 when interpolating an image value 3 at a location where an even-numbered row and the odd-numbered column intersect among the image values corresponding to the Bayer pattern. Furthermore, the first module 210 may use the fourth convolution kernel CK24 when interpolating an image value 4 at a location where the even-numbered row and the even-numbered column intersect among the image values corresponding to the Bayer pattern. That is, the first module 210 may interpolate the raw image IMG according to the red channel and generate the second interpolated image IIMG2 while maintaining the alignment in the red color of the Bayer pattern.

In an embodiment, each of the first to fourth convolution kernels CK21, CK22, CK23 and CK24 may include weights each having a fixed value. For example, in the first convolution kernel CK21, since the image value 1 at the intersection of the odd-numbered row and the odd-numbered column corresponds to the green color, the weight applied to the image value 1 may be "0", the weight applied to peripheral image values corresponding to the red color may be "½", and the weight applied to peripheral image values corresponding to the blue and green colors may be "0". In the second convolution kernel CK22, since the image value 2 at the intersection of the odd-numbered row and the even-numbered column corresponds to the red color, the weight applied to the image value 2 may be "0", and the weight applied to peripheral image values may be "0". In the third convolution kernel CK23, since the image value 3 at the intersection of the even-numbered row and the odd-numbered column corresponds to the blue color, the weight applied to the image value 3 may be "0", the weight applied to peripheral image values corresponding to the red color may be "¼", and the weight applied to peripheral image values corresponding to the green color may be "0". In the fourth convolution kernel CK24, since the image value 4 at the intersection of the even-numbered row and the even-numbered column corresponds to the green color, the weight applied to the image value 4 may be "0", the weight applied to peripheral image values corresponding to the red color may be "½", and the weight applied to peripheral image values corresponding to the blue and green colors may be "0".

In an embodiment, each of the first to fourth convolution kernels CK21, CK22, CK23 and CK24 may include weights each having a fixed value, or weights in which a fixed value and a variable value are mixed. For example, in the first convolution kernel CK21, since the image value 1 at the intersection of the odd-numbered row and the odd-numbered column corresponds to the green color, the weight applied to the image value 1 may be "1/(9*RGAIN)", the weight applied to peripheral image values corresponding to the red color may be "1/9", the weight applied to peripheral image values corresponding to the blue color may be "BGAIN/(9*RGAIN)" and the weight applied to peripheral image values corresponding to the green color may be "1/(9*RGAIN)". In the second convolution kernel CK22, since the image value 2 at the intersection of the odd-numbered row and the even-numbered column corresponds to the red color, the weight applied to the image value 2 may be "1", and the weight applied to peripheral image values may be "0". In the third convolution kernel CK23, since the image value 3 at the intersection of the even-numbered row and the odd-numbered column corresponds to the blue color, the weight applied to the image value 3 may be "BGAIN/(9*RGAIN)", the weight applied to peripheral image values corresponding to the red color may be "1/9", and the weight applied to peripheral image values corresponding to the green color may be "1/(9*RGAIN)". In the fourth convolution kernel CK24, since the image value 4 at the intersection of the even-numbered row and the even-numbered column corresponds to the green color, the weight applied to the image value 4 may be "1/(9*RGAIN)", the weight applied to peripheral image values corresponding to the red color may be "1/9", the weight applied to peripheral image values corresponding to the blue color may be "BGAIN/(9*RGAIN)", and the weight applied to peripheral image values corresponding to the green color may be "1/(9*RGAIN)". "RGAIN" is calculated according to Equation 1 above, and "BGAIN" is calculated according to Equation 2 above.

Referring to FIG. 10, the first module 210 may generate the third interpolated image IIMG3 based on the raw image IMG and the third convolution layer CL3. The first module 210 may selectively use the first to fourth convolution kernels CK31, CK32, CK33 and CK34 according to locations of image values included in the raw image IMG. For example, the first module 210 may use the first convolution kernel CK31 when interpolating an image value 1 at a location where an odd-numbered row and an odd-numbered column intersect among image values corresponding to the Bayer pattern. Further, the first module 210 may use the second convolution kernel CK32 when interpolating an image value 2 at a location where the odd-numbered row and an even-numbered column intersect among the image values corresponding to the Bayer pattern. Furthermore, the first module 210 may use the third convolution kernel CK33 when interpolating an image value 3 at a location where an even-numbered row and the odd-numbered column intersect among the image values corresponding to the Bayer pattern. Furthermore, the first module 210 may use the fourth convolution kernel CK34 when interpolating an image value 4 at a location where the even-numbered row and the even-numbered column intersect among the image values corresponding to the Bayer pattern. That is, the first module 210 may interpolate the raw image IMG according to the blue channel and generate the third interpolated image IIMG3 while maintaining the alignment in the blue color of the Bayer pattern.

In an embodiment, each of the first to fourth convolution kernels CK31, CK32, CK33 and CK34 may include weights each having a fixed value. For example, in the first convolution kernel CK31, since the image value 1 at the intersection of the odd-numbered row and the odd-numbered column corresponds to the green color, the weight applied to the image value 1 may be "0", the weight applied to peripheral image values corresponding to the blue color may be "½", and the weight applied to peripheral image values corresponding to the red and green colors may be "0". In the second convolution kernel CK32, since the image value 2 at the intersection of the odd-numbered row and the even-numbered column corresponds to the red color, the weight applied to the image value 2 may be "0", the weight applied to peripheral image values corresponding to the blue color may be "¼", and the weight applied to peripheral image values corresponding to the green color may be "0". In the third convolution kernel CK33, since the image value 3 at the intersection of the even-numbered row and the odd-numbered column corresponds to the blue color, the weight applied to the image value 3 may be "1", and the weight applied to peripheral image values may be "0". In the fourth convolution kernel CK34, since the image value 4 at the intersection of the even-numbered row and the even-numbered column corresponds to the green color, the weight applied to the image value 4 may be "0", the weight applied to peripheral image values corresponding to the blue color may be "½", and the weight applied to peripheral image values corresponding to the red and green colors may be "0".

In an embodiment, each of the first to fourth convolution kernels CK31, CK32, CK33 and CK34 may include weights each having a fixed value, or weights in which a fixed value and a variable value are mixed. For example, in the first convolution kernel CK31, since the image value 1 at the intersection of the odd-numbered row and the odd-numbered column corresponds to the green color, the weight applied to the image value 1 may be "1/(9*BGAIN)", the weight applied to peripheral image values corresponding to the blue color may be "1/9", the weight applied to peripheral image values corresponding to the red color may be "RGAIN/(9*BGAIN)" and the weight applied to peripheral image values corresponding to the green color may be "1/(9*BGAIN)". In the second convolution kernel CK32, since the image value 2 at the intersection of the odd-numbered row and the even-numbered column corresponds to the red color, the weight applied to the image value 2 may be "RGAIN/(9*BGAIN)", the weight applied to peripheral image values corresponding to the blue color may be "1/9", and the weight applied to peripheral image values corresponding to the green color may be "1/(9*BGAIN)". In the third convolution kernel CK33, since the image value 3 at the intersection of the even-numbered row and the odd-numbered column corresponds to the blue color, the weight applied to the image value 3 may be "1", and the weight applied to peripheral image values may be "0". In the fourth convolution kernel CK34, since the image value 4 at the intersection of the even-numbered row and the even-numbered column corresponds to the green color, the weight applied to the image value 4 may be "1/(9*BGAIN)", the weight applied to peripheral image values corresponding to the blue color may be "1/9", the weight applied to peripheral image values corresponding to the red color may be "RGAIN/(9*BGAIN)", and the weight applied to peripheral image values corresponding to the green color may be "1/(9*BGAIN)". "RGAIN" is calculated according to Equation 1 above, and "BGAIN" is calculated according to Equation 2 above.

Figure 11:
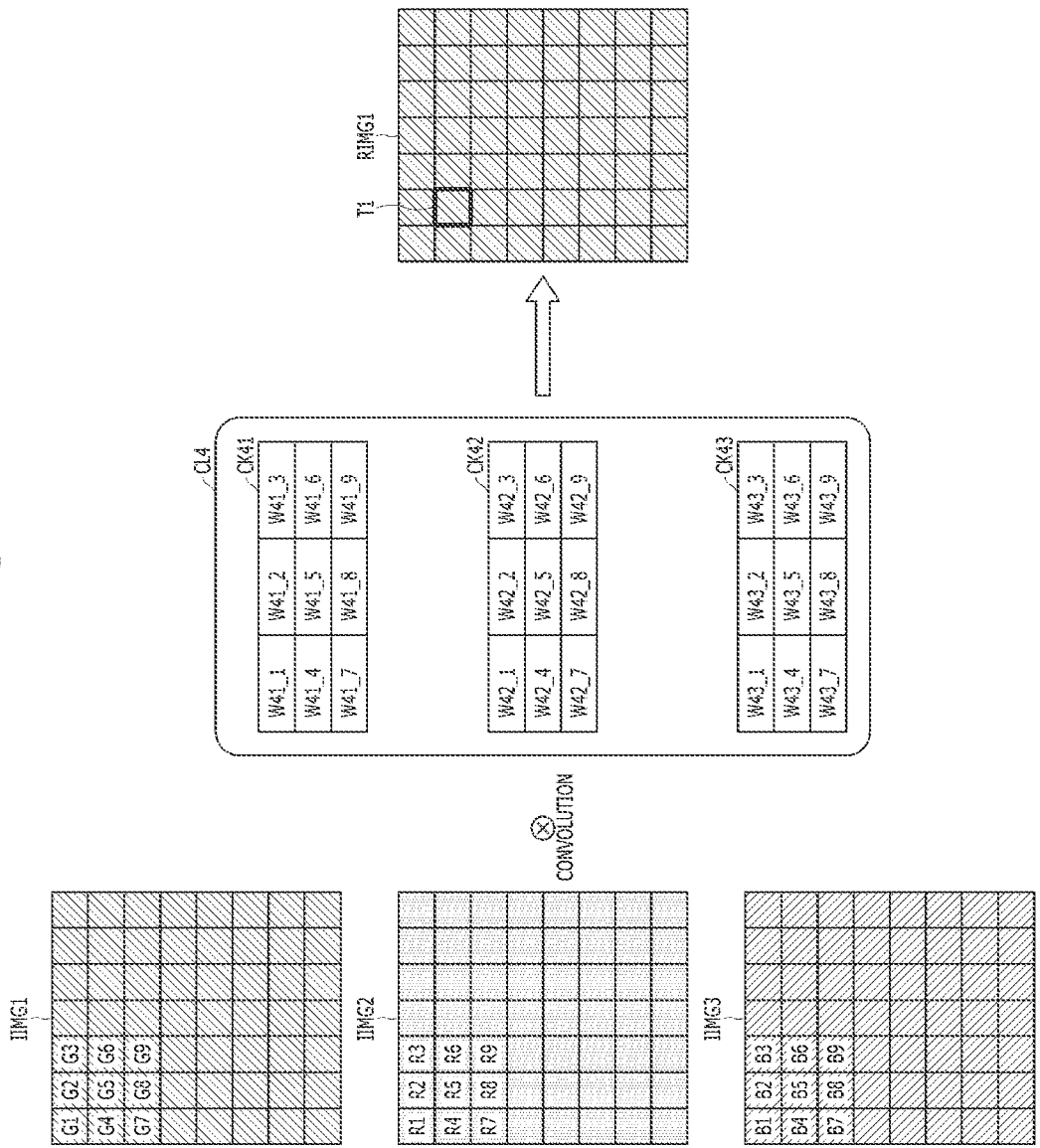
Figure 12:
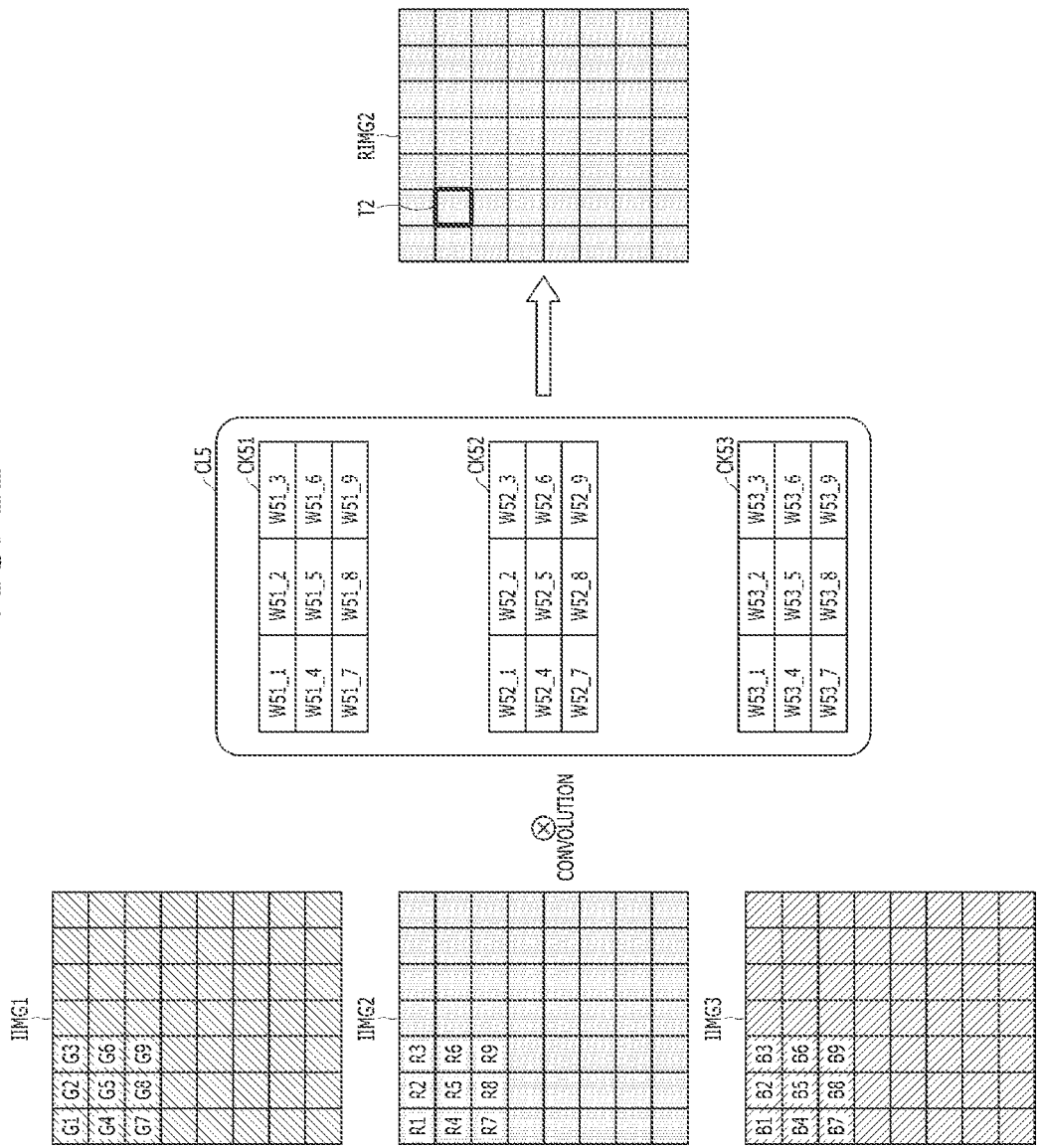
Figure 13:
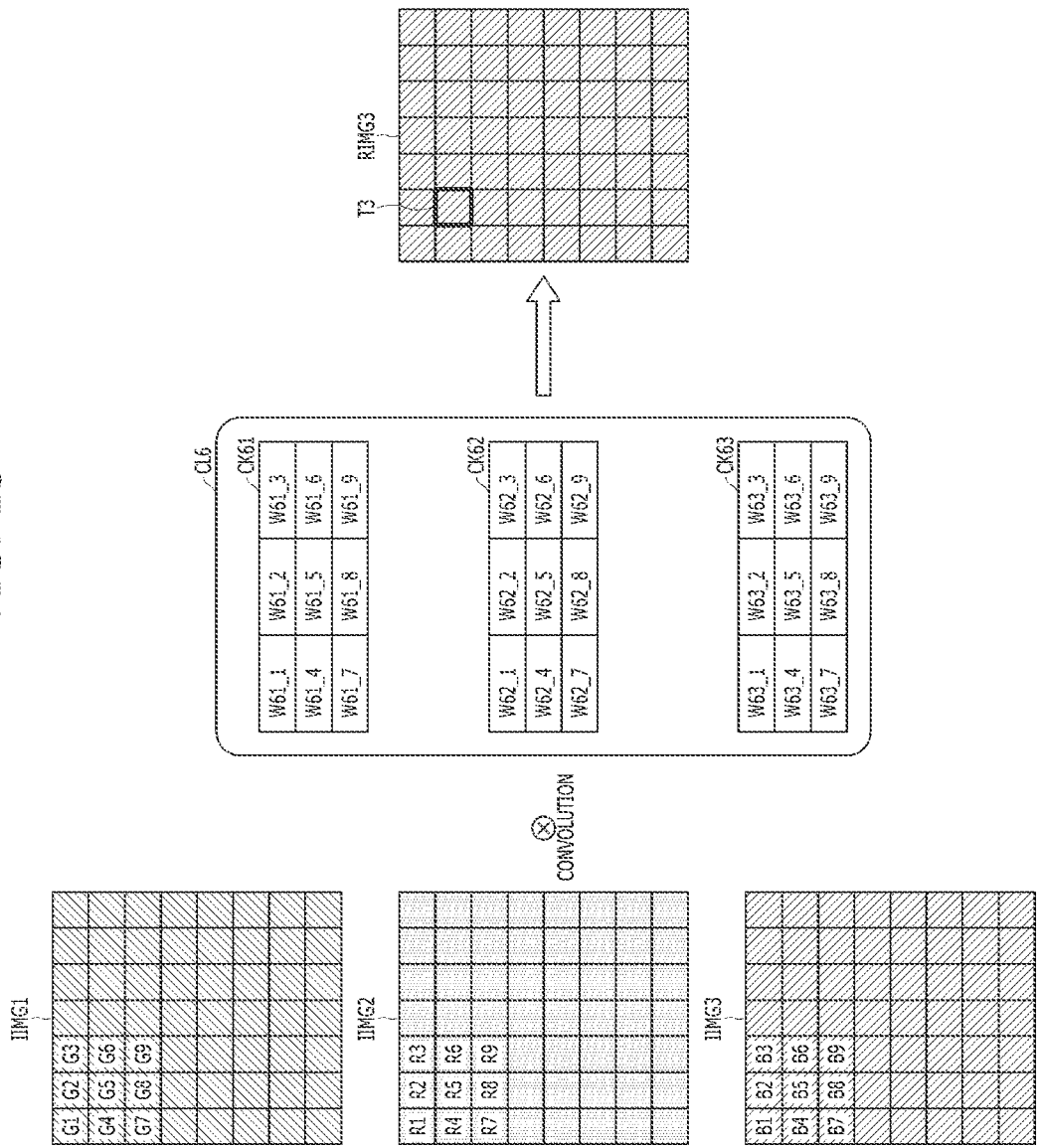

FIGS. 11 to 13 are diagrams illustrating operations of the second module 220 included in the image processor 200 in accordance with embodiments of the present disclosure.

Referring to FIG. 11, the second module 220 may generate the first refined image RIMG1 by allowing the first to third interpolated images IIMG1, IIMG2 and IIMG3 to convolute with the fourth convolution layer CL4. The fourth convolution layer CL4 may include the first to third convolution kernels CK41, CK42 and CK43 allocated for each color channel. Each of the first to third convolution kernels CK41, CK42 and CK43 may include weights. For example, the first convolution kernels CK41 may include first to ninth weights W41_1 to W41_9, the second convolution kernels CK42 may include first to ninth weights W42_1 to W42_9, and the third convolution kernels CK43 may include first to ninth weights W43_1 to W43_9. When a target image value T1 among image values included in the first refined image RIMG1 is representatively described, the target image value T1 may be calculated based on Equation 3 below.

$$T1 = \sum_{i=1}^{9} Gi * W41\_i + \sum_{i=1}^{9} Ri * W42\_i + \sum_{i=1}^{9} Bi * W43\_i \qquad \text{[Equation 3]}$$

When generating the first refined image RIMG1, the second module 220 may learn and change or update the weights included in the fourth convolution layer CL4 through the first learning algorithm.

For example, the first learning algorithm may change the weights included in the fourth convolution layer CL4, in a direction in which a difference between the first refined image RIMG1 and a first expected image decreases. When the first learning algorithm calculates a gradient by using the difference between the first refined images RIMG1 and the first expected image, back-propagates the gradient to the fourth convolution layer CL4, and updates the weights included in the fourth convolution layer CL4, the first refined image RIMG1 in a desired shape may be obtained from the raw image IMG.

Referring to FIG. 12, the second module 220 may generate the second refined image RIMG2 by allowing the first to third interpolated images IIMG1, IIMG2 and IIMG3 to convolute with the fifth convolution layer CL5. The fifth convolution layer CL5 may include the first to third convolution kernels CK51, CK52 and CK53 allocated for each color channel. Each of the first to third convolution kernels CK51, CK52 and CK53 may include weights. For example, the first convolution kernels CK51 may include first to ninth weights W51_1 to W51_9, the second convolution kernels CK52 may include first to ninth weights W52_1 to W52_9, and the third convolution kernels CK53 may include first to ninth weights W53_1 to W53_9. When a target image value T2 among image values included in the second refined image RIMG2 is representatively described, the target image value T2 may be calculated based on Equation 4 below.

$$T2 = \sum_{i=1}^{9} Gi * W51\_i + \sum_{i=1}^{9} Ri * W52\_i + \sum_{i=1}^{9} Bi * W53\_i \qquad \text{[Equation 4]}$$

When generating the second refined image RIMG2, the second module 220 may learn and change or update the weights included in the fifth convolution layer CL5 through the first learning algorithm.

For example, the first learning algorithm may change the weights included in the fifth convolution layer CL5, in a direction in which a difference between the second refined image RIMG2 and a second expected image decreases. When the first learning algorithm calculates a gradient by using the difference between the second refined images RIMG2 and the second expected image, back-propagates the gradient to the fifth convolution layer CL5, and updates the weights included in the fifth convolution layer CL5, the second refined image RIMG2 in a desired shape may be obtained from the raw image IMG.

Referring to FIG. 13, the second module 220 may generate the third refined image RIMG3 by allowing the first to third interpolated images IIMG1, IIMG2 and IIMG3 to convolute with the sixth convolution layer CL6. The sixth convolution layer CL6 may include the first to third convolution kernels CK61, CK62 and CK63 allocated for each color channel. Each of the first to third convolution kernels CK61, CK62 and CK63 may include weights. For example, the first convolution kernels CK61 may include first to ninth weights W61_1 to W61_9, the second convolution kernels CK62 may include first to ninth weights W62_1 to W62_9, and the third convolution kernels CK63 may include first to ninth weights W63_1 to W63_9. When a target image value T3 among image values included in the third refined image RIMG3 is representatively described, the target image value T3 may be calculated based on Equation 5 below.

$$T3 = \sum_{i=1}^{9} Gi * W61\_i + \sum_{i=1}^{9} Ri * W62\_i + \sum_{i=1}^{9} Bi * W63\_i \quad \text{[Equation 5]}$$

When generating the third refined image RIMG3, the second module 220 may learn and change or update the weights included in the sixth convolution layer CL6 through the first learning algorithm.

For example, the first learning algorithm may change the weights included in the sixth convolution layer CL6, in a direction in which a difference between the third refined image RIMG3 and a third expected image decreases. When the first learning algorithm calculates a gradient by using the difference between the third refined images RIMG3 and the third expected image, back-propagates the gradient to the sixth convolution layer CL6, and updates the weights included in the sixth convolution layer CL6, the third refined image RIMG3 in a desired shape may be obtained from the raw image IMG.

The third module 230 may generate the output image DIMG corresponding to the first to third refined images RIMG1, RIMG2 and RIMG3, through the second learning algorithm. For example, the third module 230 may use at least one convolution layer.

In accordance with the aforementioned embodiments of the present disclosure, when first to third modules operate based on their respective convolution layers or convolution kernels to generate an output image from a raw image, an end-to-end learning network may be implemented. When the first to third modules do not operate based on the respective convolution layers, it may be difficult to achieve back-propagation, and thus the end-to-end learning network may not be implemented.

In accordance with an embodiment of the present disclosure, when an output image is generated from a raw image, end-to-end learning may be implemented, thereby improving the performance of an image sensing device.

In addition, in accordance with an embodiment of the present disclosure, an end-to-end learning network may be easily compatible with a conventionally developed deep learning network, thereby being used in various applications.

While the present disclosure has been illustrated and described with respect to various embodiments, the disclosed embodiments are provided for description, and not intended to be restrictive. Further, it is noted that the present disclosure may be achieved in various ways through substitution, change, and modification that fall within the scope of the following claims, as those skilled in the art will recognize in light of the present disclosure.

What is claimed is:

1. An image sensing device comprising:
a first generator configured to generate a plurality of interpolated images separated for each color channel while maintaining an alignment in a set color filter pattern, based on a raw image generated through the set color filter pattern;
a second generator configured to generate a plurality of refined images based on the plurality of interpolated images and a first learning algorithm; and
a third generator configured to generate at least one output image corresponding to the raw image, based on the plurality of refined images and a second learning algorithm.

2. The image sensing device of claim 1, wherein the first generator uses a plurality of first convolution layers to generate the plurality of interpolated images.

3. The image sensing device of claim 2, wherein each of the plurality of first convolution layers includes weights each having a fixed value or weights in which a fixed value and a variable value are mixed.

4. The image sensing device of claim 1, wherein the second generator uses a plurality of second convolution layers to generate the plurality of refined images, and learns weights included in each of the plurality of second convolution layers.

5. The image sensing device of claim 1, wherein the third generator uses a plurality of third convolution layers to generate the output image, and learns weights included in each of the plurality of third convolution layers.

6. The image sensing device of claim 1, wherein the first generator includes:
a first storage area configured to store a plurality of first convolution layers; and
a plurality of interpolated generators configured to generate the plurality of interpolated images based on weights included in a corresponding first convolution layer among the plurality of first convolution layers.

7. The image sensing device of claim 6, wherein the first generator includes a calculator configured to calculate variable values among weights included in each of the plurality of first convolution layers, based on the raw image.

8. The image sensing device of claim 1, wherein the second generator includes:
a second storage area configured to store a plurality of second convolution layers; and
a plurality of learning generators configured to generate the plurality of refined images based on the plurality of second convolution layers and the plurality of interpolated images, and learn weights included in each of the plurality of second convolution layers when generating the plurality of refined images.

9. The image sensing device of claim 8, wherein the plurality of learning generators each repeat a convolution operation at least once when generating the plurality of refined images.

\* \* \* \* \*